(12) United States Patent
Blanc et al.

(10) Patent No.: US 7,403,536 B2
(45) Date of Patent: Jul. 22, 2008

(54) METHOD AND SYSTEM FOR RESEQUENCING DATA PACKETS SWITCHED THROUGH A PARALLEL PACKET SWITCH

(75) Inventors: Alain Blanc, Tourrettes sur Loop (FR); Rene Glaise, Nice (FR); Michel Poret, Gattieres (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 10/722,901

(22) Filed: Nov. 26, 2003

(65) Prior Publication Data

US 2004/0141504 A1 Jul. 22, 2004

(30) Foreign Application Priority Data

Dec. 19, 2002 (EP) .................................. 02368135

(51) Int. Cl.
*H04L 12/56* (2006.01)
(52) U.S. Cl. ....................................... 370/413; 370/428
(58) Field of Classification Search ................. 370/412, 370/411, 416, 389, 392, 357, 396.1
See application file for complete search history.

(56) References Cited

U.S. PATENT DOCUMENTS 5,166,926 A * 11/1992 Cisneros et al. ............. 370/392
5,450,397 A * 9/1995 Wahlman .................... 370/411
5,485,453 A * 1/1996 Wahlman et al. ............ 370/389

(Continued)

FOREIGN PATENT DOCUMENTS

EP 0502436 A2 * 9/1992

(Continued)

OTHER PUBLICATIONS

A terabit multiservice switch, Yun, K.Y. Appl. Micro Circuits Corp., San Diego, CA; This paper appears in: Micro, IEEE Publication Date: Jan./Feb. 2001 vol. 21, Issue: 1 On pp. 58-70.*

*Primary Examiner*—Edan Orgad
*Assistant Examiner*—Salman Ahmed
(74) *Attorney, Agent, or Firm*—Josh G. Cockburn; Dillon & Yudell LLP

(57) ABSTRACT

A method to resequence packets includes sequentially allocating in each source ingress adapter a packet rank to each packet received within each source ingress adapter. In each destination egress adapter, each ranked data packet is stored at a respective buffer address of an egress buffer. The respective buffer addresses of data packets received by a same source ingress adapter with a same priority level and switched through a same switching plane are linked in a same linked-list. The respective buffer addresses are preferably linked by their order of use in the egress buffer, and thus each linked-list is having a head list pointing to the oldest buffer address. The linked-lists are sorted into subsets including those linked-lists linking the respective buffer addresses of data packets received by a same source ingress adapter with a same priority level. For each subset of linked-lists, the packet ranks of the data packets stored at the buffer address pointed by the head lists of each linked-list of each subset are compared to determine the next data packet to be put in a sequence.

12 Claims, 9 Drawing Sheets

U.S. PATENT DOCUMENTS

| | | | | |
|---|---|---|---|---|
| 5,689,505 | A * | 11/1997 | Chiussi et al. | 370/388 |
| 6,249,528 | B1 * | 6/2001 | Kothary | 370/466 |
| 6,272,567 | B1 * | 8/2001 | Pal et al. | 710/56 |
| 6,647,017 | B1 * | 11/2003 | Heiman | 370/412 |
| 6,963,567 | B1 * | 11/2005 | Kaniz et al. | 370/392 |
| 7,061,929 | B1 * | 6/2006 | Eberle et al. | 370/423 |
| 7,136,391 | B1 * | 11/2006 | Yasukawa et al. | 370/416 |
| 2002/0064154 | A1 * | 5/2002 | Sharma et al. | 370/357 |
| 2002/0064170 | A1 * | 5/2002 | Siu et al. | 370/412 |
| 2003/0063618 | A1 * | 4/2003 | Khacherian et al. | 370/413 |
| 2005/0083939 | A1 * | 4/2005 | Yasukawa et al. | 370/395.1 |
| 2008/0013535 | A1 * | 1/2008 | Khacherian et al. | 370/389 |

FOREIGN PATENT DOCUMENTS

| | | | |
|---|---|---|---|
| EP | 0702472 | A1 * | 3/1996 |
| EP | 0938212 | A1 * | 8/1999 |
| WO | WO0070422 | * | 11/2000 |
| WO | WO0223816 | * | 3/2002 |

* cited by examiner

US 7,403,536 B2

METHOD AND SYSTEM FOR RESEQUENCING DATA PACKETS SWITCHED THROUGH A PARALLEL PACKET SWITCH

FIELD OF THE INVENTION

The present invention relates to high speed switching of data packets in general, and more particularly to a method and system for resequencing data packets after switching through a parallel packet switch.

BACKGROUND OF THE INVENTION

DWDM, which stands for Dense Wavelength Division Multiplexing, by merging onto a single optical fiber many wavelengths, is making available long-haul fiber-optic data communications links of huge aggregate capacity. Each wavelength is an independent communications channel which typically operates at OC48c i.e. 2.5 Gigabits per second or $10^9$ bits per Second (Gbps), OC192c (10 Gbps) and in some systems at OC768c (40 Gbps). These formats and rates are part of a family available for use in optical interfaces, generally referred to as SONET, which is a standard defined by the American National Standards Institute (ANSI) of which there exists an European counterpart, mostly compatible, known as SDH (Synchronous Digital Hierarchy). Thus, at each node of a network, the data packets or cells carried on each DWDM channel must be switched, or routed, by packet-switches that process and then switch packets between different channels so as to forward them towards their final destination. If, ideally, it would be desirable to keep the processing of packets in the optical domain, without conversion to electronic form, this is still not really feasible today mainly because all packet-switches need buffering that is not yet available in an optical form. So packet-switches will continue to use electronic switching technology and buffer memories for some time to come.

However, because of the data rates as quoted above for individual DWDM channels (up to 40 Gbps) and the possibility of merging tenths, if not hundredths, of such channels onto a single fiber the throughput to handle at each network node can become enormous i.e., in a multi-Tera or $10^{12}$ bits per second range (Tbps) making buffering and switching, in the electronic domain, an extremely challenging task. If constant significant progress has been sustained, for decades, in the integration of always more logic gates and memory bits on a single ASIC (Application Specific Integrated Circuit), allowing implementation of the complex functions required to handle the data packets flowing into a node according to QoS (Quality of Service) rules unfortunately, the progress in speed and performance of the logic devices over time is comparatively slow, and now gated by the power one can afford to dissipate in a module to achieve it. Especially, the time to perform a random access into an affordable memory e.g., an imbedded RAM (Random Access Memory) in a standard CMOS (Complementary MOS) ASIC, is decreasing only slowly with time while switch ports need to interface channels having their speed quadrupling at each new generation i.e. from OC48c to OC192c and to OC768c respectively from 2.5 to 10 and 40 Gbps. For example, if a memory is 512-bit wide allowing storing or fetching, in a single write or read operation, a typical fixed-size 64-byte (8-bit byte) packet of the kind handled by a switch, this must be achieved in less than 10 Nano or $10^{-9}$ second (Ns) for a 40 Gbps channel and in practice in a few Ns only in order to take care of the necessary speed overhead needed to sustain the specified nominal channel performance while at least one store and one fetch i.e., two operations, are always necessary per packet movement. This represents, nowadays, the upper limit at which memories and CMOS technology can be cycled making the design of multi-Tbps-class switch extremely difficult with a cost-performance state-of-the-art technology such as CMOS, since it can only be operated at a speed comparable to the data rate of the channel they have to process.

Hence, to design and implement a high capacity packet-switch (i.e.: having a multi-Tbps aggregate throughput) from/to OC768c (40 Gbps), a practical architecture, often considered to overcome the above mentioned technology limitation, is a parallel packet switch (PPS) architecture. As shown on FIG. 1, it is comprised of multiple identical lower-speed packet-switches (100) operating independently and in parallel. Generally speaking, in each ingress adapter such as (110), an incoming flow of packets (120) is spread packet-by-packet by a load balancer (130) across the slower packet-switches, then recombined by a multiplexor (140) in the egress adapter e.g., (150). As seen by an arriving packet, a PPS is a single-stage packet-switch that needs to have only a fraction of the performance necessary to sustain a PPS port data rate (125). If four planes (100) are used, as shown in FIG. 1, their input ports (102) and output ports (104) need only to have one fourth of the performance that would otherwise be required to handle a full port data rate. More specifically, four independent switches, designed with OC192c ports, can be associated to offer OC768c port speed, provided that ingress and egress port-adapters (110, 150) are able to load balance and recombine the packets. This approach is well known from the art and sometimes referred to as 'Inverse Multiplexing' or 'load balancing'. Among many publications on the subject one may e.g., refer to a paper published in Proc. ICC'92, 311.1.1-311.1.5, 1992, by T. ARAMAKI et al., untitled *'Parallel "ATOM" Switch Architecture for High-Speed ATM Networks'* which discusses the kind of architecture considered here.

The above scheme is also attractive because of its inherent capability to support redundancy. By placing more planes than what is strictly necessary it is possible to hot replace a defective plane without having to stop traffic. When a plane is detected as being or becoming defective ingress adapter load balancers can be instructed to skip the defective plane. When all the traffic from the defective plane has been drained out it can be removed and replaced by a new one and load balancers set back to their previous mode of operation.

Thus, if PPS is really attractive to support multi-Gbps channel speeds and more particularly OC768c switch ports it remains that this approach introduces the problem of packet re-sequencing in the egress adapter. Packets from an input port (110) may possibly arrive out of sequence in a target egress adapter (150) because the various switching paths, comprised of four planes (100) in the example of FIG. 1, do not have the same transfer delay since they run independently thus, can have different buffering delays. A discussion and proposed solutions to this problem can be found, for example, in a paper by Y. C. JUNG et al., 'Analysis of out-of-sequence problem and preventive schemes in parallel switch architecture for high-speed ATM network', published in IEE Proc.-Commun., Vol. 141, No. 1, Feb. 1994.

However, this paper does not consider the practical case where the switching planes have also to handle packets on a priority basis so as to support a Class of Service (CoS) mode of operation, a mandatory feature in all recent switches which are assumed to be capable of handling simultaneously all sorts of traffic at nodes of a single ubiquitous network handling carrier-class voice traffic as well as video distribution or just straight data file transfer. Hence, packets are processed differently by the switching planes depending on the priority tags they carry. This no longer complies with the simple FCFS (First-Come-First-Served) rule assumed by the above referenced paper and forces egress adapters to readout packets as soon as they are ready to be delivered by the switching planes after which they can be re-sequenced on a per priority basis.

Also, the above paper implicitly assumes the use of a true Time Stamp (TS) which means in practice that all port-adapters are synchronized so as packets from different sources are stamped from a common time reference which is a difficult and expensive requirement to meet.

Another difficulty with a PPS architecture stems from the fact that networks must not only support unicast traffic (one source to one destination) but also multicast traffic that is, traffic in which a source may have to send a same flow of packets to more than one destination. Video distribution and network management traffic are of this latter case (e.g., the IP suite of protocols assumes that some control packets must be broadcast). In practice, this prevents a simple numbering of packets in each source, on a per destination and per priority basis, from being used which would allow the implementation of a straightforward and inexpensive re-sequencing in each egress adapter on a per flow basis. For example, with a 64-port switch there are only 64 unicast flows (times the number of priority) for each source since there are only 64 possible destinations, a number that is easily manageable. However, there are possibly $2^{64}$-65 (times the number of priority) combinations of multicast possible flows from a same source. Each flow would have to be numbered separately to keep coherency in the packet numbers received by the egress adapters (n, n+1, n+2, etc.). However, $2^{64}$ is an impossible number to deal with as far as the implementation of resources is concerned.

Therefore, the numbering of packets sent from a source can only be envisaged if it ignores the destination of the packets (so as unicast and multicast traffic can be processed identically in the egress adapters). In other words, packets must be marked at source either with a true TS (Time Stamp) or, if not strictly with a TS, with a common counter (or a counter per priority), in each ingress adapter and counter(s) incremented with each departing packet irrespective of its destination(s). The second solution is obviously preferred on a cost viewpoint since it does not assume any form of synchronization between the ingress port-adapters of a switch. As stated in JUNG's paper quoted above (in section 4.1), the packet re-sequencing function is complex to implement as a result of using time stamps since it assumes that egress adapters are able to restore sequences of packets marked with numbers in ascending order i.e., n, $n_x$, $n_y$, etc. where the only assumption that holds is that n<$n_x$<$n_y$ since each source, using a TS or a common counter is free to interleave the sending of packets to any combination of destinations.

Thus, there is a need for a resequencing arrangement to overcome the difficulties mentioned here above in order to make feasible a PPS architecture in which variable delays can be experienced in the individual switching planes while supporting priority classes of unicast and multicast traffic in view of the implementation of a multi-Tbps switch.

The present invention offers such complete approach and solution.

SUMMARY OF THE INVENTION

It is therefore an object of the invention to provide a system and method to restore sequences of data packets in each egress adapter of a parallel packet switch architecture.

It is another object of the invention to support unicast as well as multicast traffic with a single mechanism from a common set of resources.

It is still another object of the invention to provide ingress adapters that neither need to be synchronized nor require to use a true time stamp to mark the packets.

It is yet another object of the invention to offer a redundancy scheme that does not require extra specific resources, on top of what is necessary to support unicast and multicast traffic, be required to carry out transparently the hot removal and insertion of parts.

Those objects are achieved by a system that comprises means to operate the resequencing method as claimed.

In an embodiment, the system is having a plurality of source ingress adapters to receive data packets having each a given priority level. The data packets are next switched through a plurality of independent parallel switching planes to be delivered to at least one destination egress adapter among a plurality of destination egress adapters. To resequence the data packets delivered to the egress adapters, the method comprises the steps of sequentially allocating in each source ingress adapter a packet rank to each data packet received within each source ingress adapter. After switching each ranked data packet through at least one switching plane, the method comprises in each destination egress adapter, the steps of storing each ranked data packet at a respective buffer address of an egress buffer. The respective buffer addresses of data packets received by a same source ingress adapter with a same priority level and switched through a same switching plane are linked in a same linked-list among a plurality of linked-lists. The respective buffer addresses are preferably linked by their order of use in the egress buffer, and thus each linked-list is having a head list pointing to the oldest buffer address. The plurality of linked-lists are sorted into subsets that comprise those linked-lists linking the respective buffer addresses of data packets received by a same source ingress adapter with a same priority level. Finally, for each subset of linked-lists, the packet ranks of the data packets stored at the buffer address pointed by the head lists of each linked-list of each subset are compared to determine the next data packet to be put in a sequence.

In yet another embodiment where the packets have the same priority, the method comprises the steps of:
  in each ingress port-adapter, inserting a packet rank (PR) into each packet to be switched through the parallel packet switch;
  switching the ranked packets through the parallel packet switch; and
  in each egress port-adapter:
  reading out the switched packets from the parallel packet switch;
  storing the switched packets read out from the parallel packet switch into an egress buffer;
  selecting the oldest packet of each of sets of packets stored in the egress port-adapter, each set being comprised of packets coming from the same switching plane and the same ingress port-adapter;
  selecting the oldest packet of the oldest packets selected in the selecting step and which come from the same ingress port-adapter, according to the value of their packet ranks, for each ingress port-adapter, thereby providing a subset of older packets, each subset corresponding to an ingress port-adapter;
  validating the content of each subset; and
  selecting the packet to exit the egress port-adapter among the subsets validated in the validating step.

Further objects, features and advantages of the present invention will become apparent to the ones skilled in the art upon examination of the following description in reference to the accompanying drawings. It is intended that any additional advantages be incorporated herein.

DETAILED DESCRIPTION OF AN EMBODIMENT

Figure 1:
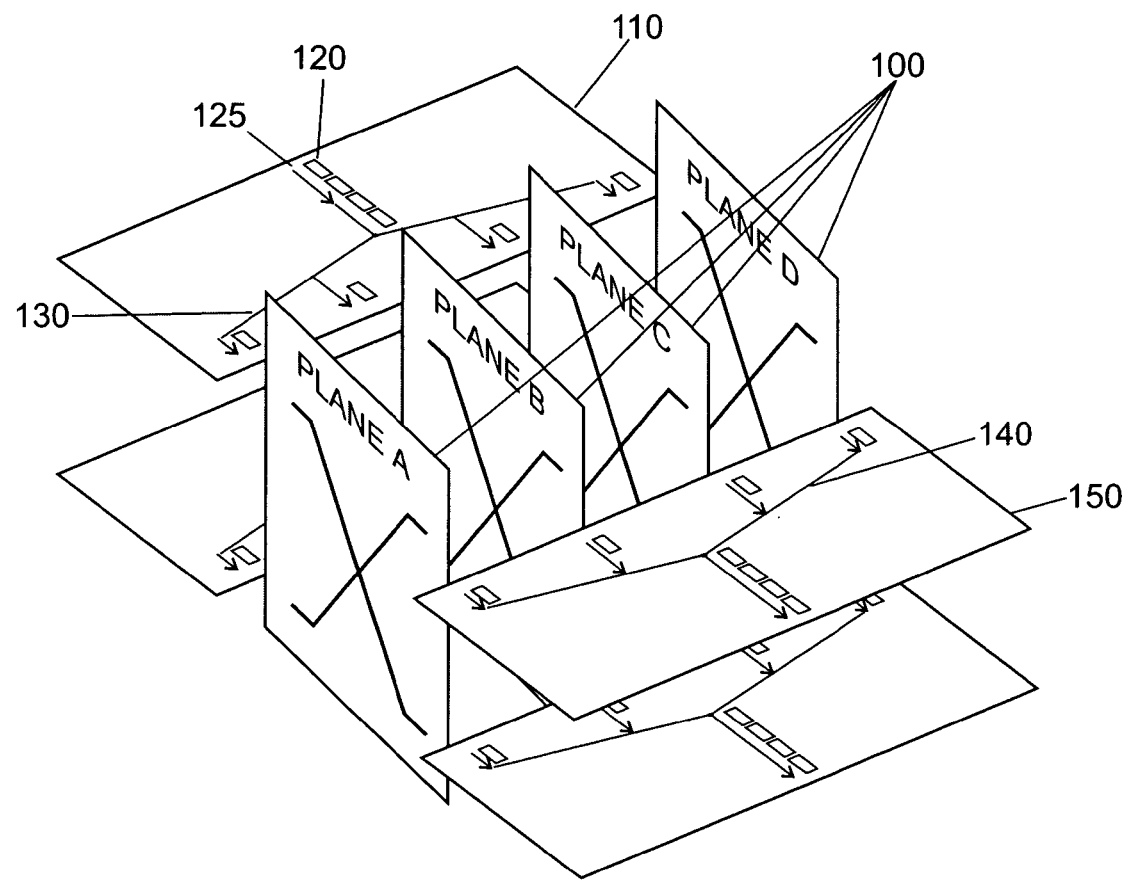
FIG. 1 shows a conceptual view of a parallel packet switch system to implement the invention.
Figure 2:
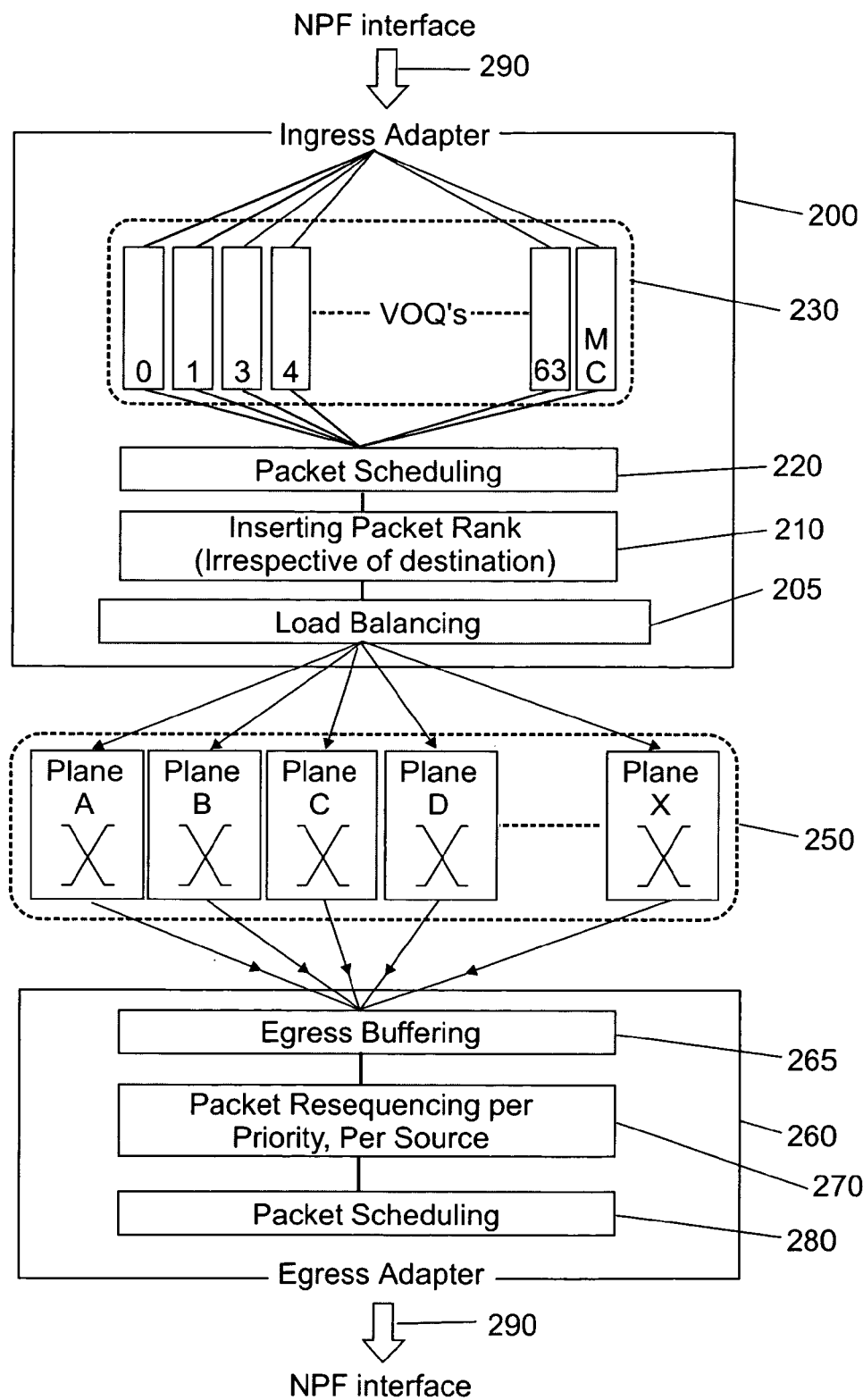
FIG. 2 is a block diagram showing the main components of an embodiment of the invention.

FIG. 2 shows a functional view of a PPS architecture according to the invention. For sake of clarity, only one ingress adapter (200) is shown interfacing a plurality of switching planes (planes A to X block 250) over which an incoming traffic (290) is load balanced by a load balancer circuit (205). The skilled man will easily understand throughout the reading of the entire description that all functional principles are generalized.

To allow the re-sequencing of data packets in the egress adapters (260) all packets arriving in the ingress adapter are ranked (210). The packet ranking may be realized indifferently prior to or while load-balancing the packets. It is to be appreciated that the invention is as well applicable even if a sequence of data packets is not load-balanced. The ranking can be done with a true time stamp (TS), in which case packets would be marked with their actual departure time, the invention just requires that packets need to be numbered e.g., from the current value of a common counter incremented with each packet leaving an ingress adapter i.e., with a rudimentary TS that neither needs to reflect the actual time nor require any form of synchronization between the ingress adapters so packets are ranked independently in each ingress adapter. Whichever method is adopted to stamp the packets, the ranking is done irrespective of the destination of each packet so as to support, through a single mechanism, not only unicast and multicast traffic but also the hot removal and insertion of a switching plane to provide for redundancy as this will be further discussed in the following description of the invention.

Then, after switching through the various planes (250), the ranked packets delivered to the egress adapter (260) are temporarily stored in an egress buffer (265). As mentioned earlier, reading out the packets from the switch planes should be done without delay since switching planes are assumed to process packets on a per priority basis too and, in no case, a packet of lower priority should stay on the way of a higher priority packet since this would create a priority HoL (head of line) blocking. As already stated above, the invention assumes that the marking of packets in each source or ingress adapter need not to use a true TS (although it does not prevent it) thus, the counters used to rank the packets (210) are not required to be in synchronization in the various ingress adapters or sources of packets. As a consequence, the packets from different sources cannot (and need not to) be compared to restore their sequence. In other words, the invention assumes that packet re-sequencing is not only performed independently on a per priority basis but as well on the basis of their source irrespective of the traffic type (multicast or unicast). Hence, packets are read out as soon as they are ready to leave the switch planes in order to perform re-sequencing in each egress adapter where they need to be temporarily stored (265).

Although the invention is thus devised to work with switching planes handling packets on the basis of their priority i.e., processing first packets of higher priorities, it may operate as well without priority in which case only the source of the packet or ingress port-adapter from which it comes is to be considered in the re-sequencing of packets.

The above mode of operation i.e., re-sequencing per source and possibly per priority, assumes that each egress adapter is equipped with an output scheduler (280) role of which is to select, at each packet cycle, what is the next packet, temporarily stored in the egress buffer (265), due to leave the egress adapter. Egress packet scheduling is a mechanism that is beyond the scope of the invention and is not further discussed other than to mention that its role is normally to serve the waiting packets of highest priorities first while, for each priority, maintaining fairness between the sources of traffic that are independently re-sequenced.

There is also a similar packet scheduling function (220) in each ingress adapter which selects the waiting incoming packets to be switched. Generally, waiting packets are organized under the form of VOQ's (Virtual Output Queues) (230), a scheme well known from the art which prevents priority and port destination HoL blocking in the ingress adapters so that a waiting incoming packet can neither be blocked by a lower priority packet nor by a packet destined for a busy switch output-port. These are standard functions in switch port-adapters. Packet scheduling (220, 280) and VOQ's (230) are not part of the invention which does not require any specific behaving from these elements to operate as specified in the rest of the description. FIG. 2 and following figures illustrate the invention assuming that the switch is a 64-port switch so VOQ's have 64 unicast (UC) destinations (0-63) per priority plus the multicast (MC) destination. For this latter case there is, per flow, only one packet sent to one of the switching planes (as chosen by the load balancing function) which must replicate it to the multiple destinations concerned by the multicast flow to which packet belongs.

Switch port-adapters generally have a standard line or NP (network processor) IN and OUT interface (290) e.g., such as the ones defined by the Network Processing Forum (NPF), 39355 California Street, Suite 307, Fremont, Calif. 94538.

Figure 3:
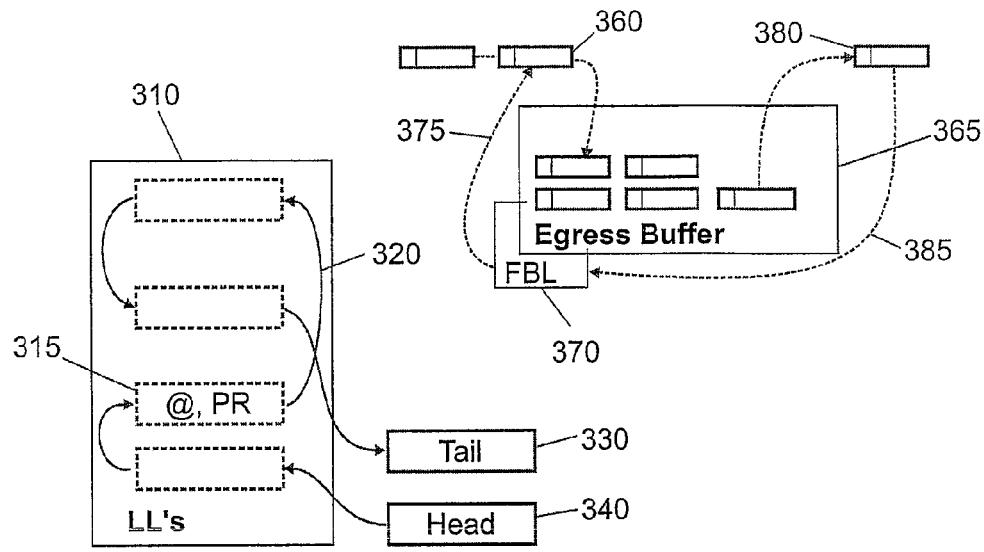
FIG. 3 is a block diagram of the main components of the egress adapter of FIG. 2.

FIG. 3 shows how the egress buffering function, FIG. 2 (265), is organized in an embodiment of the invention. Each readout packet, switched through any of the PPS plane, such as (360) is temporarily stored in a packet egress buffer (365) which is typically made of a RAM (Random Access Memory) either internal to an ASIC (Application Specific Integrated Circuit) used to implement the Ingress and Egress port-adapter functions or is using commercially available discrete RAM modules controlled by the ASIC. Enough buffering should be provided to allow re-sequencing of all packet flows being handled in egress adapter at any moment. The upper value to consider is highly dependent on the behavior of the switching planes used to implement the PPS structure. The invention just assumes that buffer size has been dimensioned to allow re-sequencing under worst case conditions. In practice this is achieved by having a flow control implemented between the various components of the switching function i.e., the ingress and egress adapters and the individual switch planes.

Then, associated to the packet egress buffer (365) there is a list of free buffers or FBL (Free Buffer List) (370). With each incoming packet (360) a free buffer location is withdrawn (375) from FBL so that packet can immediately be stored. This is done irrespective of its priority, rank and plane through which it arrived in egress adapter. However, in parallel, each incoming packet location is appended to a LL (Linked List) of packets and hold e.g., in a RAM (310). There are as many LL's (320) as there are priorities, sources and planes. That is, each incoming packet (360) is appended to the particular link list it belongs; so it becomes the tail of this LL, address of which is remembered in a register (330), one per LL. Similarly, there is a register, for each possible LL, that holds LL head (340). Therefore, each LL remembers the order of arrival of the packets on a per priority and per source basis through each of the planes. If, for example, switch planes are handling 8 priorities and there are 64 sources (i.e., switches are 64-port switches) while the PPS structure is comprised of up to 8 planes the number of LL's is then: 8×64×8=4092. Although this is a large number of LL's (this is definitively a manageable number however when compared to the huge number of possible multicast and unicast flows i.e., $2^{64}-1$, that an adapter must potentially be able to support) it is worth noting that the addressing range of the memory that holds the LL's (310) is bounded by the number of locations of the packet-buffer (365). Since LL's remember the addresses of where the packets are stored and because packet locations are uniquely attributed by FBL (370) all LL's can share the same memory (310) space. Head (330) and tail (340) registers must remember where each LL starts and ends though. In the particular example chosen to illustrate the invention one needs to have 4092 such pairs of registers, or the equivalent, as this will be further discussed in next figure. Therefore, each record of a LL, such as (315) contains the address of the next packet in sequence (thus, forming the linked list) plus its packet rank PR so as the head PR register described hereafter in FIG. 4 can be updated too.

Obviously each time a packet is forwarded (380) the corresponding buffer location is released (385) to FBL (370) which is free to reuse it immediately.

The mechanisms described above are not further discussed since they use techniques well known in the art. Especially, forming LL's has been the subject of numerous publications. For a discussion on this subject one may refer, e.g., to a book by Robert Sedgewick, 'Algorithms', second edition, Addison-Wesley, 1988, ISBN 0-201-06673-4 and more specifically to chapter 3 'Elementary Data Structures'.

At this point it is worth noting that if the invention were assuming the use of a true time stamp this would not require having one LL per source. Thus, 8 (priorities) times 8 (planes)=64 LL's would be sufficient however, at the expense of having to synchronize all the adapters that is a costly solution to implement and which is not free of complications. Again, if the invention works as well when all packets are marked with a true TS this is not a requirement to allow their re-sequencing according to the invention.

Figure 4:
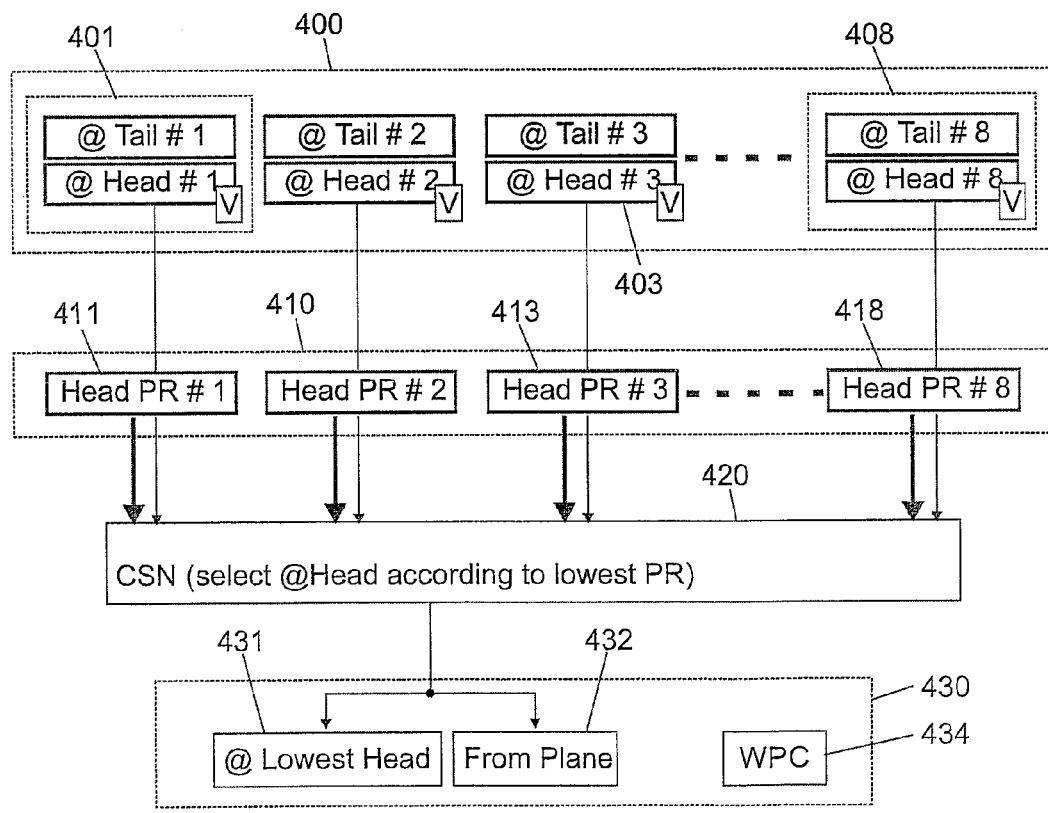
FIG. 4 details the main components of FIG. 3.

FIG. 4 further describes resources that are needed in the egress adapter to re-sequence the packets arriving through the switch planes. As already briefly discussed in FIG. 3, the locations of tails and heads of every LL are remembered in register pairs. For each source and each priority there are such a pair of registers (401) per plane plus a valid bit latch (V) to indicate if the corresponding LL is active i.e., if there are indeed one or more packets in the egress buffer belonging to that LL thus, if values in registers are really meaningful. What is shown in FIG. 4 is a row (400) of such register pairs (401 to 408) with their valid latches for one source and one priority assuming that PPS structure is made of up to 8 planes in this particular example used to illustrate the invention. The content of the register pairs is simply the address of the egress buffer where the corresponding packet has been stored.

There is also, for each source and each priority, a third register per plane (411) that holds the value the packet was stamped with by the source i.e., the rank of the cell (a true TS or just a packet counter) corresponding to the packet which is at the head of the LL. This value, referred to as PR (packet rank), in the rest of the description is extracted when a packet is readout from the switching plane it has come through at the time it is written in the egress buffer. For the row (410) of such PR registers (411 to 418), a combinatorial sorting network or CSN (420) allows comparing all plane head PR's register contents (411 to 418) to determine which one contains the lowest value so as to select the corresponding head of line buffer address. For example, assuming that PR register (413) contains at some point of time the lowest value among the 8 PR's (411 to 418) then, head register (403) is selected, contents of which is the address from where in the egress buffer next to go packet must be picked. This choice is made on the ground that the lower the PR value the older the waiting packet. And, because each plane is assumed of not introducing disordering in the delivery of packets (within packets at a same level of priority) only the LL head PR corresponding to one source and one priority, received through the PPS planes, have to be compared to determine which is the next to go packet. This is further discussed in the following description.

Whichever packet is selected the corresponding egress buffer address is transferred to a lowest head address register (431) to which is associated a plane register (432), remembering plane through which the selected packet has come through. The egress packet scheduling function of FIG. 2 (280) will pick this value when it selects a packet from a source and a priority to leave the egress adapter. This is further discussed in FIG. 7 that describes the outgoing packet process.

This set of hardware resources (430) also includes a WPC or waiting packet counter (434) which counts the total number of packets in standby from one source at one priority. Each time a packet is leaving the egress adapter, count is decremented. It is incremented each time a packet is received through any of the planes.

CSN block of logic (420) need not to be further described since it uses techniques well known from those that are skilled in the art. On the subject of 'networks for sorting' one may refer e.g., to a book by D. E. Knuth, 'The Art of Computer Programming', Volume 3, Sorting and Searching, Chapter 5.3.4, 'Networks for sorting', Addison-Wesley, 1973. Also, there are patents on the subject such as the U.S. Pat. No. 5,319,788 'Modified BATCHER Network for Sorting Unsorted Input Signals in Log2N Sequential Passes', Jun. 7, 1994, E. R. Canfield et al.

Figure 5:
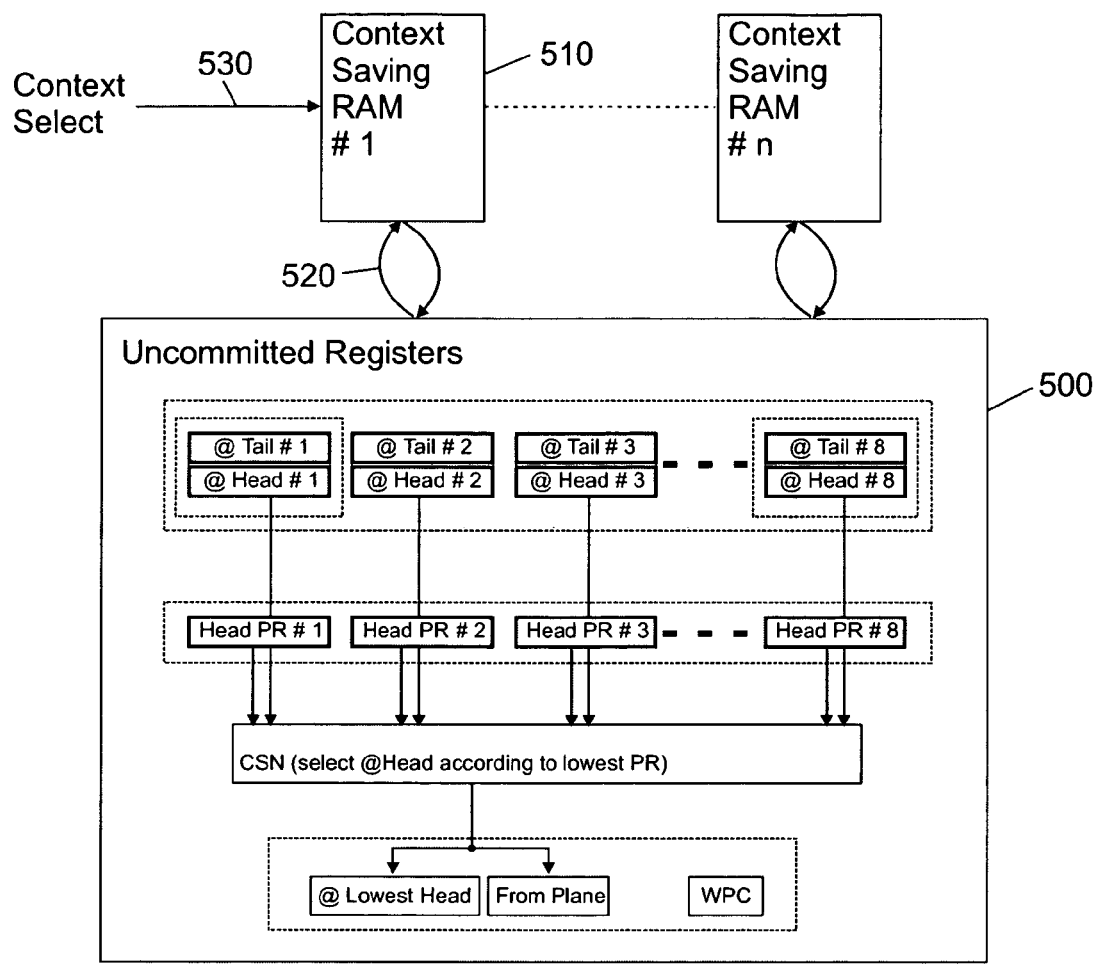
FIG. 5 shows an implementation of the main components of FIG. 4.

FIG. 5 shows a preferred implementation of the registers and resources shown in FIG. 4. This approach assumes there is actually only one set (or just a few sets e.g., one per priority) of uncommitted resources (500) corresponding to what is shown in FIG. 4. Thus, instead of having to implement a large number of dedicated registers (dedicated to one source, one priority and, for the heads and tails, to one plane too) there is one or just a few sets of uncommitted registers and sorting networks active at any given time. In which case there is also one or more context-saving RAMs such as (510) that hold the registers contents corresponding to one source and one priority that must be fetched and stored back (520) after each use. Although this is not mandatory to carry out the invention, this way of doing is preferred especially when the number of priorities and the number of ports to handle are high since the total number of registers are multiplied by those two factors e.g., 512 (64 ports times 8 priorities) as discussed previously. Therefore, in this example, the context select or address bus (530) of the context-saving RAMs must be able to address 512 locations where register contents are remembered.

However, one exception to the storing in a context-saving RAM is that of the LL valid bit (V) latches, shown in (401) FIG. 4. As explained in FIG. 8 and subsequent figures, the valid bit latches are used to generate the requests posted to the egress packet scheduler and referred to, in the following, as 'valid bit to scheduler' or VB2S. They all need (i.e., the 512 rows of 8 bits in the example chosen to illustrate the invention) to be permanently available thus preventing their storing into a context-saving RAM.

Dedicated registers could be chosen especially, in applications where the number of ports and priorities is low or for performance reasons since there is obviously a price to pay for fetching and storing back the register contents.

Figure 6:
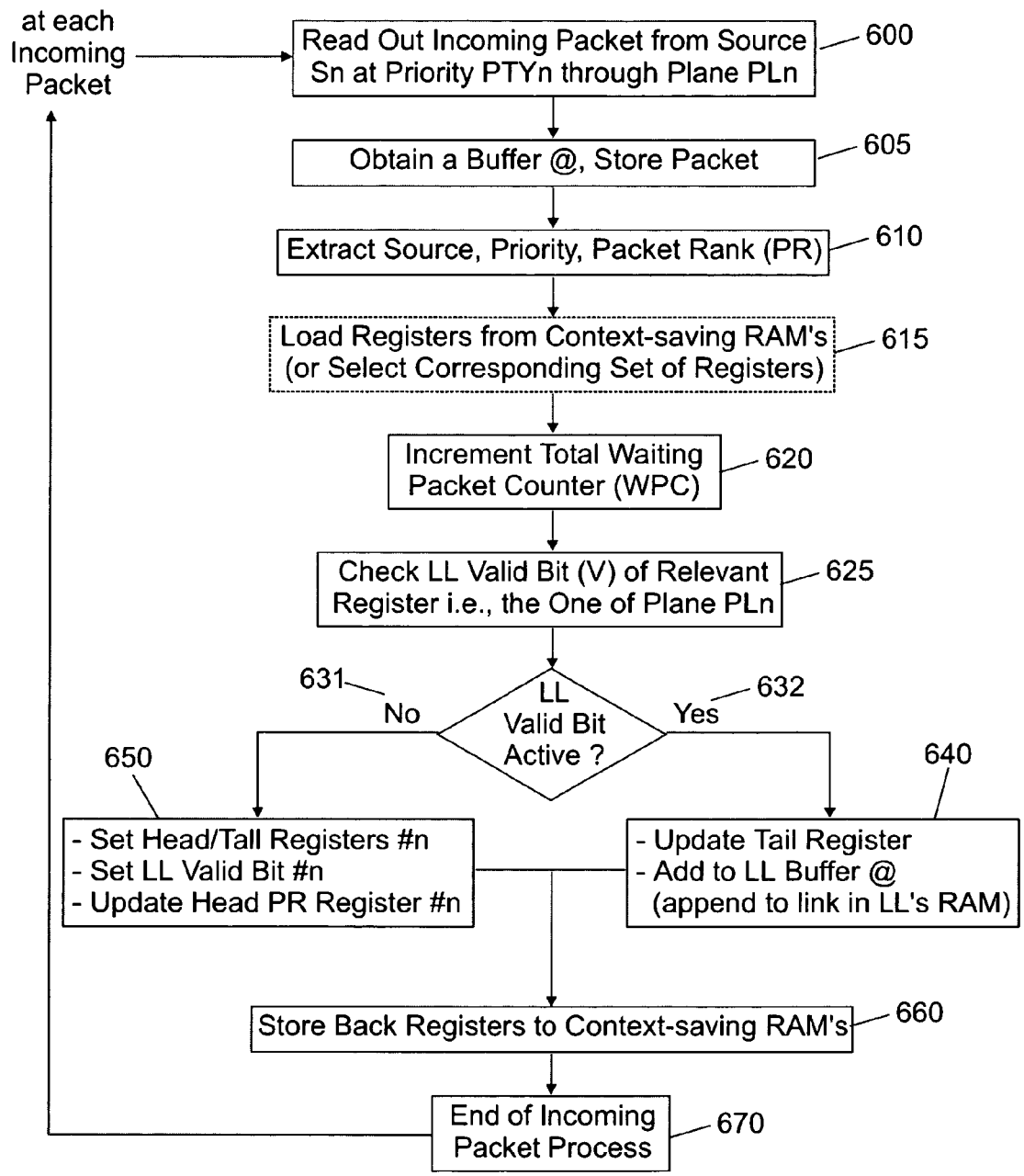
FIG. 6 is a flow chart of the operations to store data packets in the egress buffer of FIG. 2.

FIG. 6 describes the process to handle any ranked packet received in the egress adapter through a PPS plane. This flow chart assumes that context-saving RAMs are used. The corresponding steps (615, 660) could be skipped or modified accordingly if dedicated registers were instead implemented.

When a packet is read out (step 600) from one of the switching plane (PLn) from a given source (Sn) at a given priority (PTYn) it is unconditionally stored in the egress buffer shown in FIG. 3. Then, Free Buffer List FBL selects an address (@) in buffer where packet is temporarily stored (step 605). Prior or while storing packet, its source, priority and rank (as set by the source in ingress adapter) are extracted (step 610). Then, corresponding registers are fetched and loaded (step 615) from the context-saving RAM's shown in FIG. 3. The waiting packet count (WPC) is incremented (step 620) after which LL valid bit (V) corresponding to the plane through which current packet has come is checked (step 625). If not active (branch 631) a new active LL is started which means setting the valid bit and the corresponding head and tail registers with the unique buffer address (@) where incoming packet has been stored. Also, the head packet rank (PR) is updated (step 650). When started a new active LL is only comprised of one element thus, head and tail are identical.

If, however, LL valid bit was found active (branch 632), which means there is already an active LL for that source, that priority and that plane, the incoming packet is appended thus, tail register only is updated (640) and a corresponding entry in LL's RAM, shown in FIG. 3 (310), is made so as LL now includes one more element.

The invention does not make any assumption on the way LL are actually formed. As already stated, there is an abundant literature on the subject. However, since the performance is at stake in a Tbps-class switch, forming and updating a LL should not require more than one write of the LL's RAM when a new element is appended (or removed). Various techniques and methods that allow achieving this objective are known by those skilled in the art.

Finally, when LL has been formed or updated the corresponding registers are stored back in the context-saving RAM (step 660) which ends the process of receiving a packet in egress adapter (step 670).

FIG. 8 to FIG. 11 discuss the packet re-sequencing process. A packet waiting in the egress buffer may not be allowed to leave the adapter until it has been re-sequenced. In other words, one must be sure that a packet of lower rank can no longer be expected, from a different plane, to authorize the current lowest head packet, as selected by CSN (420) of FIG. 4 and present in address register (431), to leave the egress adapter. This is achievable based on the assumptions that packets read out by the egress adapters, from the switching planes, can be classified in one of the following three categories illustrated on FIG. 8:

An IDLE packet is read out (800). Packets of this category are dummy packets, their role is to keep in synchronization and running the very high speed (multi-Gbps) links used to implement the port interfaces between the switch core planes and the egress adapters. Additionally, they may carry the in-band flow control information necessary to pace the traffic traversing the switch fabric. Preferably, the switch core planes are all work-conserving. That is, in no case (but the exception packets as explained hereafter) an idle packet can be read out from a switch plane port if a regular packet, of any priority, is waiting within switch core plane for that port. Obviously idle packets are discarded in the egress adapter after the flow control information they carry is removed.

A REGULAR packet is read out (810) i.e., a user packet at a given priority from a given source. Priority and source are normally carried in the header part of the packets (801). Packets of this type are assumed to have been handled by the planes on a strict priority basis.

An EXCEPTION packet (820) is either a user packet or an idle packet that has been handled by a switch core plane against the above strict priority rule or which violates the work-conserving principle. This is the case of lower priority user packets released by a switch plane even though there are waiting packets of higher priorities. This is common practice in many switches e.g., to guarantee a minimum bandwidth to lower priority traffic thus, avoiding a complete bandwidth starvation in presence of 100% higher priority traffic. Also, there might have situations where idle packets are delivered while there are user packets held temporarily in switch for a given port (thus, deliberately violating the work-conserving principle). This may be the result of flow control actions made to avoid congestion e.g., to prevent a port egress buffer from overflowing.

In the preferred embodiment of the invention the user or idle packets be marked by the switch core, e.g., by setting a bit in the header of the packets, so as they are recognized in the egress adapters and can be acted on accordingly. Hence, as discussed in following figures, the EXCEPTION packets will not be permitted to participate in the setting of the 'valid bit to scheduler' or VB2S bits, described in FIG. 9, since they are not conforming to the priority rule or violate the work-conserving principle.

Figure 9:
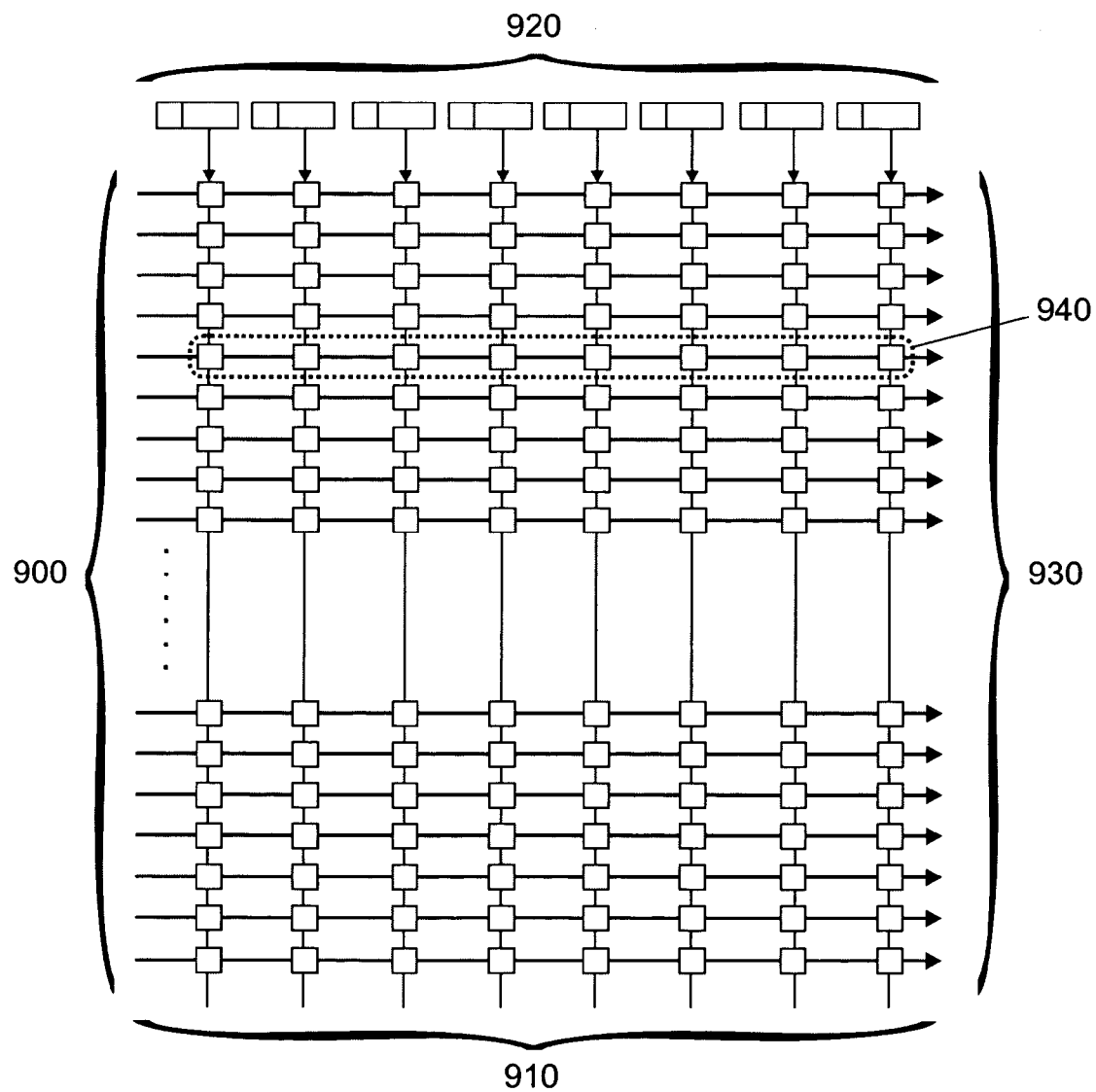
FIG. 9 shows the preferred matrix implementation of the set of registers to generate the vector of requests.

FIG. 9 shows the set of registers, conceptually organized under the form of a matrix, used to generate the vector-of requests (930) to be posted to the egress scheduler (280) i.e., the 'valid bit to scheduler' or VB2S's. Matrix has as many rows (900) as there are sources and priorities to handle i.e., 512 in the example used throughout the description of the invention where 64 sources and 8 priorities are assumed (thus, output scheduler must arbitrate between 512 requests). Matrix has 8 columns (910) i.e. one per switching plane. For each set of packets readout from each plane (920) the contents of the matrix registers are reassessed so that VB2S's can be set from each corresponding row of the matrix (930). All matrix rows are identical. One row (940) is detailed in FIG. 10.

Figure 10:
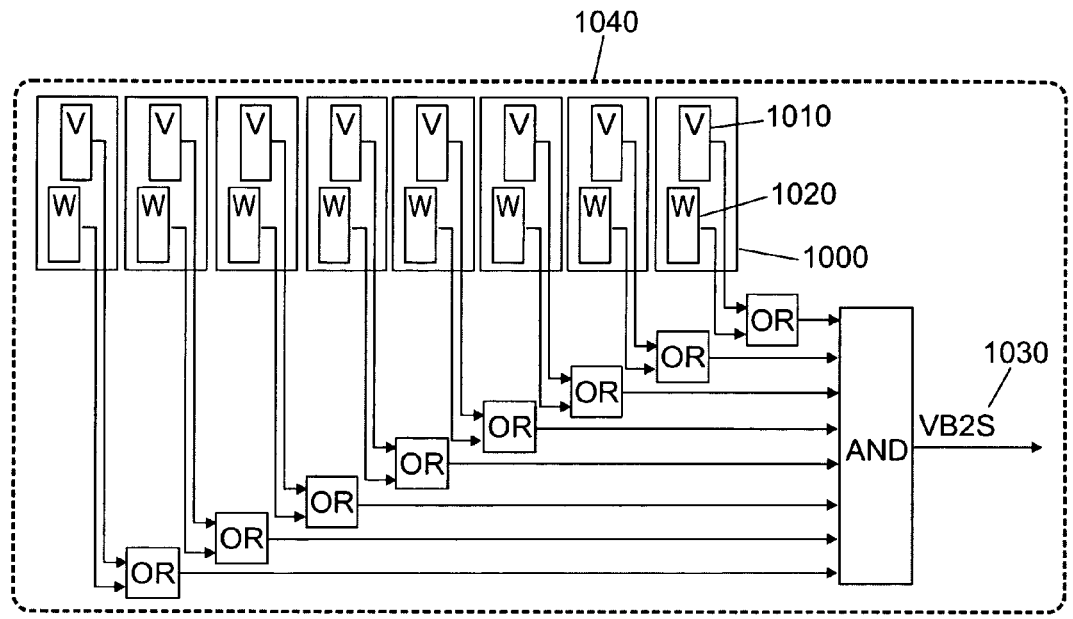
FIG. 10 shows a row of latch pairs of a cross-point of the matrix of FIG. 9.

FIG. 10 thus describes a row (1040) of latch pairs present at each cross-point (1000) of the matrix of FIG. 9. One latch of each latch pair e.g., (1010), corresponds to the valid bit (V) already shown in FIG. 4 (401). It is set as discussed in FIG. 6 (650) and stays active as long as there is a linked list of packets (possibly comprised of a single packet), waiting in buffer memory. As already discussed in FIG. 6, there is possibly one such an active LL per source (Sn), per priority (PTYn) and per plane (PLn). Hence, when a valid bit is set, the packet at head of the corresponding LL, becomes candidate to leave the egress adapter. Again, there is one such row (1040) for each source and each priority and there are as many latch pairs as there are planes. That is, there are 8 latch pairs in each of the 512 rows (64 sources×8 priorities) in the example used to illustrate the invention.

Figure 7:
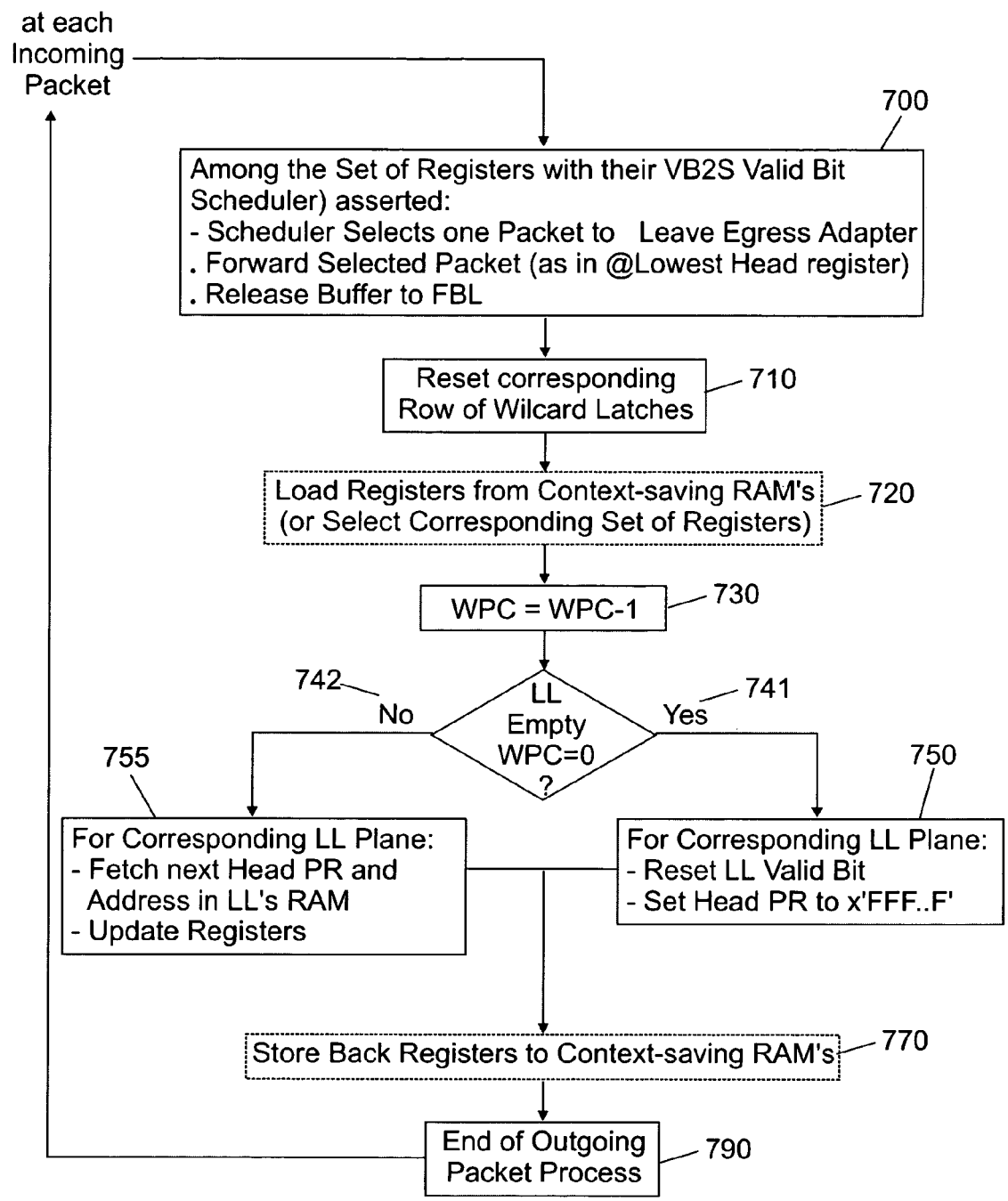
FIG. 7 is a flow chart of the process of a data packet leaving an egress adapter.
Figure 8:
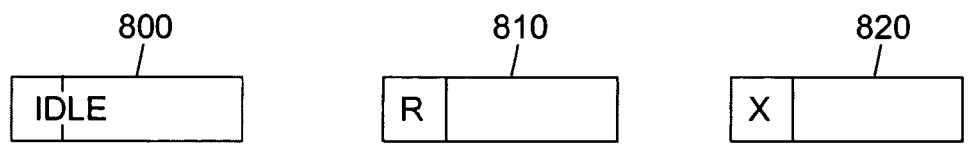
FIG. 8 shows the category bit header of the three different categories of data packets.

The second latch of a pair e.g., (1020) is reset each time the corresponding head LL packet is forwarded according to the outgoing packet process described in FIG. 7. It can be set again as soon as an IDLE packet or a REGULAR packet (as it is defined in FIG. 8), carrying a priority tag strictly less than the one of the corresponding row, is received from the corresponding plane. This second latch is thus a wildcard latch for that source, that priority and that plane allowing to set VB2S (1030). This is possible because the invention assumes that switching planes are work-conserving which implies that, if an IDLE packet is readout from a switching plane, no other packets are possibly waiting in the switch plane for that output port so, re-sequencing can ignore it. Similarly, if a REGULAR packet carrying a lower priority tag is read out, no packet of priority corresponding to the row considered can possibly be expected instead so, re-sequencing can ignore the plane too. In both cases this is achieved through the setting of the corresponding wildcard latch (1020). Obviously, if a user or idle EXCEPTION packet, as defined in FIG. 8, is readout it cannot be used to set any of the wildcard latches since the priority rule has not been followed in the switch plane or the work-conserving principle has been deliberately violated generally, as the result of a flow control action.

Therefore, VB2S (1030) can be set active when there is either a head of line packet waiting in each column i.e., for each plane, or the corresponding wildcard latch has been set. Then, the lowest head PR, as selected by CSN of FIG. 4, becomes candidate to leave the egress adapter. A plane for which the wildcard latch is set cannot be selected by CSN since, as explained previously, if a LL is not active for that plane the corresponding head PR is set to the maximum possible value of the register and will not be selected by the sorting network which is devised to pick the lowest PR value.

Figure 11:
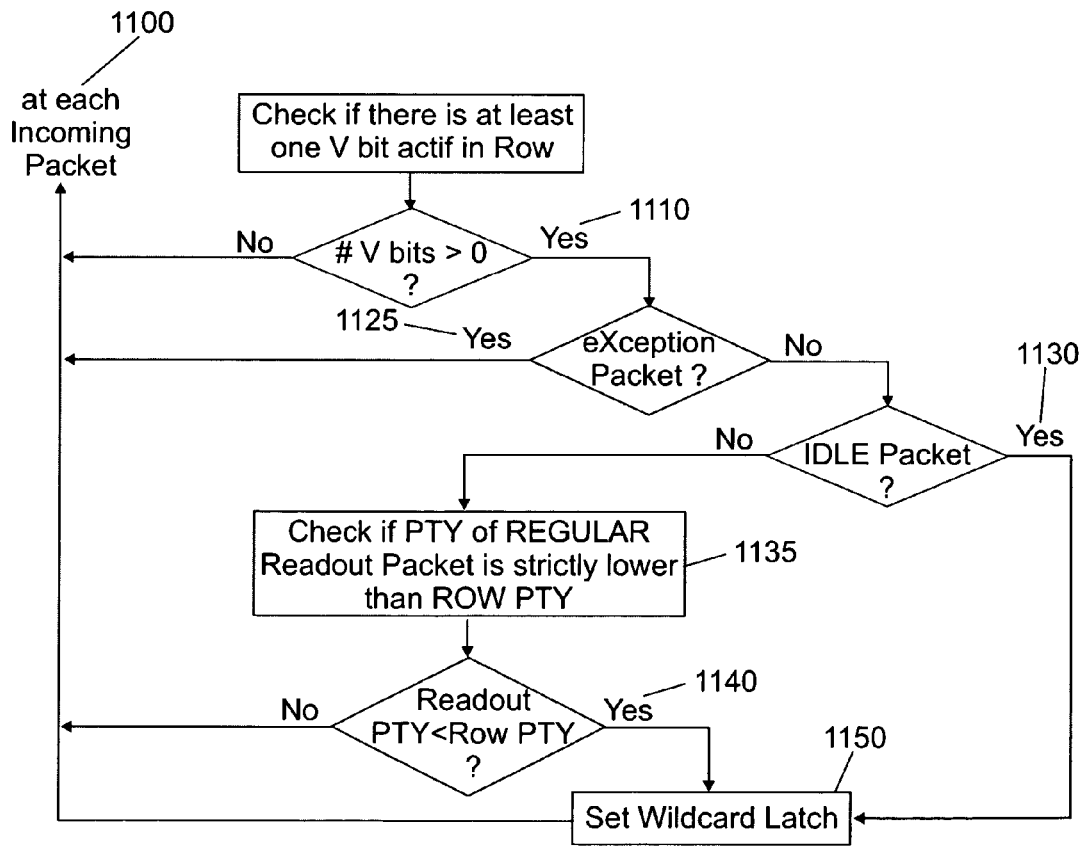
FIG. 11 is a flow chart of the wildcard latches setting operation.

FIG. 11 further discusses the conditions under which the wildcard latches are set.

At each packet cycle (1100) a wildcard latch belonging to a row at priority PTYn can be set (1150) if an IDLE packet is received (1130) or if a REGULAR packet, from any source, is received (1135) that carries a priority tag strictly less than the one attached to the corresponding row (1140). Setting is first enabled by the presence of at least one valid bit active in that row (1110) which is indicative of the fact there is indeed at least one packet waiting to be forwarded in buffer memory for that source and that priority thus, requiring that VB2S be eventually posted to the egress scheduler when one can be sure that no other packet, of a rank lower than the one(s) already received, can no longer be expected from any plane.

As far as the reset of wildcard latches is concerned all wildcard latches of a row must be reset each time a packet of the corresponding row is selected to leave the egress adapter by the output scheduler. This is achieved by the outgoing packet process of FIG. 7 at step (710) so that a decision of authorizing a packet to leave the adapter because a wildcard latch is set (in lieu of a valid bit) is possibly reassessed at each packet time.

It is worth noting here that if all LL's, for a given source and priority, have packets waiting in buffer memories all valid bits are active and VB2S is continually set irrespective of the wildcard latch values.

Also, the process here described is done in parallel in all rows. Especially, when an IDLE packet is readout from a plane, the corresponding column of wildcard latches (making here a reference to the matrix representation of FIG. 9) have all to be set in the rows where at least one packet is waiting i.e., in up to the 512 rows of the example used to illustrate the invention. Similarly, when a regular packet of a certain priority is received all wildcard latches of rows having a lesser priority have possibly to be all set.

Again, an EXCEPTION packet cannot set any wildcard latch. This is checked at step (1120). As far as the VB2S vector is concerned, an idle or a user EXCEPTION packet is thus just ignored (1125). A user EXCEPTION packet can only result in the setting of the corresponding LL valid bit latch shown e.g., in FIG. 10 (1010) i.e., the one corresponding to the packet source and priority, and plane through which packet has come.

FIG. 7 describes the process of a packet leaving the egress adapter. The selection of a packet due to leave the adapter is done on the basis of the VB2S (valid bit to scheduler) vector of bits, shown in FIG. 9 (930), and permanently posted to the egress packet scheduler function shown in FIG. 2 (280) to let it know which ones of the sources and priorities have actually a packet, waiting in the egress buffer, that may be forwarded. The vector here mentioned is thus made of all row outputs as shown in FIG. 10. They are permanently made available to the scheduler so as this latter has a full view of the waiting packets thus, has all the information it needs to make a decision at each outgoing packet cycle.

The algorithm on which scheduler chooses a next packet to go is beyond the scope of the invention which does not assume any particular method of selection. In general, the waiting packets of the highest priority have precedence however, at a same level of priority, fairness must be exercised between all sources and exceptions may have to be considered to the strict priority rule if, e.g., one wants to guarantee a minimum bandwidth to lower priority traffic. All of this is highly dependent on the architectural choices that are made to fulfill the requirements of a particular application.

Hence, in the particular example used throughout the description of the invention, where 64 ports and 8 priorities are assumed, the VB2S vector is thus comprised of 512 bits i.e., one bit for each priority and each source port.

Once a choice is made, selected packet is forwarded so as corresponding buffer can be released to FBL (step 700). The corresponding row of wildcard latches is reset (step 710) to allow a reassessment of the corresponding VB2S as already mentioned with the description of FIG. 11. Then, corresponding registers (the ones for the source and priority of the just gone packet) are loaded (step 720) from the context-saving RAM (or they are selected in case of dedicated registers).

WPC is decremented (step 730). If LL is now empty (branch 741) i.e., if WPC=0, V (LL valid bit) is reset while the corresponding head PR register is set to its maximum value i.e., x'FFFF . . . F' in hexadecimal notation (step 750) so as it cannot be selected by the sorting network CSN (420 in FIG. 4) as already discussed. However, if LL is not empty (branch 742) i.e., if WPC>0, the LL head register address and the head PR, corresponding to the plane through which packet initially arrived are updated (step 755). The updated information is obtained by interrogating the LL's RAM (310 of FIG. 3) so as the address of the next packet in sequence replaces, in the head register address, the one of the packet that has just gone. The head PR is replaced too. As a result of this last operation CSN automatically performs a new choice so as the lowest head address and plane registers (431, and 432 of FIG. 4) are updated. When done, the registers are stored back in the context-saving RAM (step 770) which ends the process of sending a packet from the egress adapter (step 790).

Figure 12:
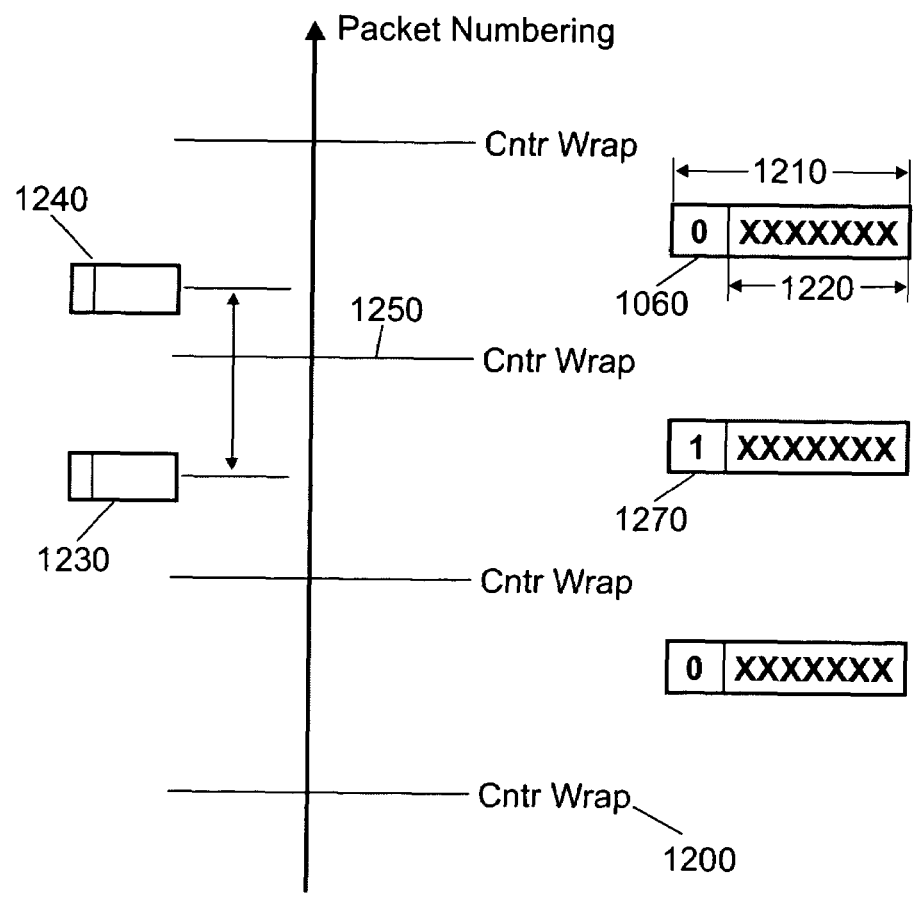
FIG. 12 is a schematic view to illustrate the wrapping of the source counters.

FIG. 12 briefly discusses the problem of the wrapping (1200) of the source counters used to rank the packets. Those counters have a finite length thus, whichever their counting capacity the problem of their wrapping must be solved. The invention assumes that those counters (one or more e.g., one per priority, in each source or ingress adapter) have one bit more (1210) than what is necessary to number the packets. For a given application the counting capacity (1220) must be determined so that the oldest numbered packet still waiting in the egress buffer (1230) cannot be wrongly compared with a new arriving packet (of the same source with the same priority) because the counter used in the source has wrapped in the mean time. Once this value has been determined the invention assumes that the counters are all made one bit wider so that numbering of waiting packets cannot span on more than one counter wrapping boundary (1250). Then, it is easy to take care of the counter wrapping. One solution consists in detecting the first occurrence of a readout packet number for which MSB (most significant bit) is found to be 0 (1260) after a series of ones. In which case the egress resources must immediately start to use the PR fields in toggling the value of the MSB bit. This is especially true for CSN shown in FIG. 4 that compare PR values to pick the lowest one.

In a preferred embodiment of the invention, as far as packet numbering is concerned source counters are devised so that the highest possible value i.e.: x'FFF . . . FF', in hexadecimal notation, is skipped in the numbering of packets. This is necessary so that when a link list in the egress adapter is empty the corresponding head PR register e.g., (403) in FIG. 4, can be set to a value that cannot be selected by CSN (420).

It must be clear to those skilled in the art that the re-sequencing according to the invention as described here above in FIGS. 2 to 12 does not require any dedicated resources to implement a transparent switch over in case of failure of a switching plane. Indeed, ingress adapters through the load balancing function may be instructed to skip a plane any time in view of its replacement or, for any other reason, while all egress adapters keep re-sequencing transparently since the scheme according to the invention neither require that all planes be active nor make an assumption on the way traffic is load balance by the ingress adapters thus, meeting the objective of having a free transparent switch-over mechanism as a result of the use of the invention.

Also, because re-sequencing is done on the sole basis of restoring an ascending sequence of numbers or PR's and since numbering of packets is done at source, irrespective of their destinations, unicast and multicast traffic can indeed be handled transparently in egress adapters by the exact same mechanism of the invention.

Finally, although the description of the invention assumes that packets departing from egress adapters are numbered in ascending order, those skilled in the art will recognize that this is just an option. Among other possibilities, packets could be numbered in descending order as well thus, requiring that the CSN of FIG. 4 pick the highest value instead in which case, if a LL is not active, the head PR registers would have to be set to all zeros x'000 . . . 00' (instead of x'FFF . . . FF') while ingress counters would have to be devised to skip this value. More generally, the invention can easily be adapted by those skilled in the art to cope with other methods of numbering packets at source while still practicing it.

While the invention has been particularly shown and described with references to an embodiment, it will be understood by those skilled in the art that various changes in both form and detail may be made therein without departing from the scope and spirit of the invention.

Having thus described our invention, what we claim is as follows:

1. A method for re-sequencing packets comprising:
  a) in each ingress port-adapter (200), inserting a packet rank (PR) into each packet (210) to be switched through a parallel packet switch (250);
  b) switching the ranked packets through the parallel packet switch; and
  in each egress port-adapter (260):
  c) reading out (600) the switched packets from the parallel packet switch;
  d) storing (605) the switched packets read out from the parallel packet switch into an egress buffer (265);
  e) selecting the oldest packet (403) of each of sets of packets stored in the egress port-adapter, each set being comprised of packets coming from the same switching plane and the same ingress port-adapter, wherein selecting the oldest packet comprises: e1) forming a plurality of linked lists (310) of egress buffer addresses, each linked list containing the egress buffer addresses of the packets switched through a same said switching plane and coming from the same ingress port-adapter; and e2) selecting the oldest address of each of the linked lists;
  f) selecting the oldest packet (420) of the oldest packets selected in e) and which come from the same ingress port-adapter, according to the value of their packet ranks, for each ingress port-adapter, thereby providing a subset of older packets, each subset corresponding to an ingress port adapter;
  g) validating the content of each subset (1030); and
  h) selecting the packet to exit the egress port-adapter among the subsets validated in g).

2. The method according to claim 1 further comprising associating to each linked list a valid condition which is made active when the linked list is active.

3. The method according to claim 1 further comprising:
  e3) associating to each packet a packet identifier representative of a regular, idle or exception status; and
  e4) associating to each linked list a wildcard condition which is made active whenever at least one of the valid conditions associated to the linked lists sharing a same said source, is active, and an idle packet is read out from the parallel packet switch.

4. The method according to claim 1 wherein g) comprises validating a subset of older packets originated from a same ingress port-adapter when either one of the valid condition or corresponding wildcard condition is valid for all switching planes.

5. The method according to claim 1 further comprising:
i) forwarding the packet selected in h); and
j) resetting a set of wildcard conditions associated to the same ingress adapter as the forwarded packet.

6. The method according to claim 1 further comprising:
k) incrementing a waiting packet counter (WPC) each time a packet is received by the egress adapter from the same ingress adapter; and
each time a packet is forwarded:
   l) decrementing the waiting packet counter associated to the same ingress adapter as the forwarded packet; and
   m) resetting the corresponding valid condition and setting the value of the packet rank of the oldest packet addressed by a corresponding linked list to its maximum, if the value of the associated waiting counter is null.

7. A method for re-sequencing packets carrying a priority which have been switched through the parallel packet switch comprising:
a) in each ingress port-adapter, inserting a packet rank into each packet to be switched through the parallel packet switch;
b) switching the ranked packets through the parallel packet switch; and in each egress port-adapter:
c) reading out the switched packets from the parallel packet switch;
d) storing the switched packets read out from the parallel packet switch into an egress buffer;
e) selecting the oldest packet of each sets of packets stored in the egress port-adapter, each set being comprised of packets coming from the same switching plane, the same ingress port-adapter with the same priority wherein selecting the oldest packet comprises: e1) forming a plurality of linked lists of egress buffer addresses, each linked list containing the egress buffer addresses of the packets switched through a same said switching plane, from a same ingress port-adapter at a same said priority; and e2) selecting the oldest address of each of the linked lists;
f) selecting the oldest packet of the oldest packets selected in e) and which come from the same ingress port-adapter with the same priority, according to the value of their packet ranks, for each ingress port-adapter and each priority, thereby providing a subset of older packets, each subset corresponding to an ingress port-adapter and a priority;
g) validating the content of each subset; and
h) selecting the packet to exit the egress port-adapter among the subsets validated in g).

8. The method according to claim 7 further comprising associating to each linked list a valid condition which is made active when the linked list is active.

9. The method according to claim 8 further comprising:
i) associating to each packet a packet identifier representative of a regular, idle or exception status; and
j) associating to each linked list a wildcard condition which is made active whenever at least one of the valid conditions associated to the linked list sharing a same said source and a same said priority, is active, and an idle packet is read out from the parallel switch or a regular packet having a priority lower than the one associated to the wildcard latch, is read out from the parallel packet switch.

10. The method according to claim 9 wherein g) further comprising validating a subset of older packets originated from a same ingress port-adapter with same priority when either one of the valid condition or corresponding wildcard condition is valid for all switching planes.

11. The method according to claim 9 further comprising:
k) forwarding the packet selected in h) of claim 7; and
l) resetting the set of wildcard conditions associated to the same ingress adapter and same priority as the forwarded packet.

12. The method according to claim 8 further comprising:
m) incrementing a waiting packet counter (WPC) each time a packet is received by the egress adapter from the same ingress adapter with the same priority; and
each time a packet is forwarded:
   n) decrementing the waiting packet counter associated to the same ingress adapter and same priority as the forwarded packet; and
   o) resetting the corresponding valid condition and setting the value of the packet rank of the oldest packet addressed by the corresponding linked list to its maximum, if the value of the associated waiting counter is null.

* * * * *